May 12, 1970     J. M. POGUE     3,511,457
AERIAL CARGO DISPENSER
Filed Sept. 6, 1968
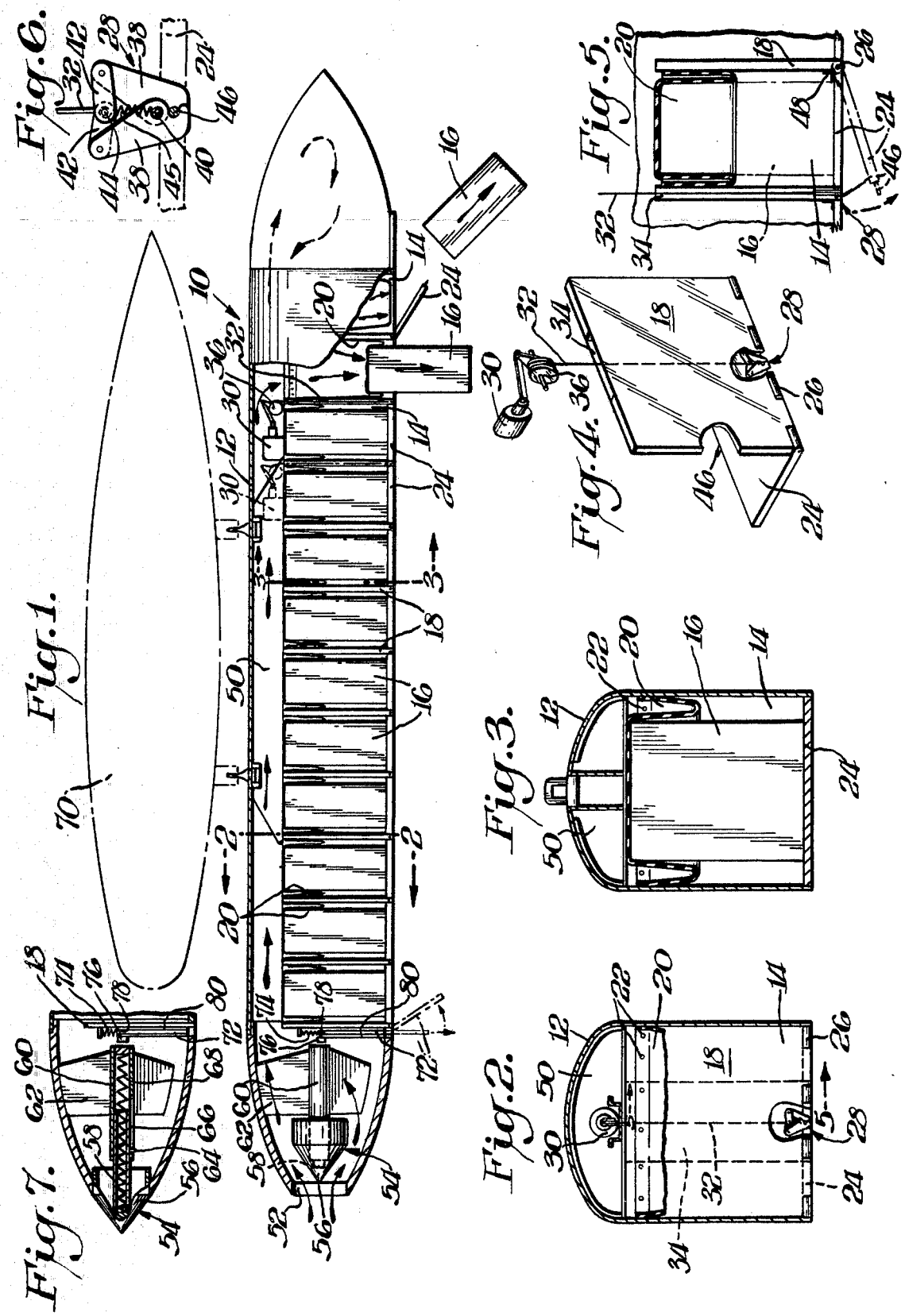

United States Patent Office 3,511,457
Patented May 12, 1970

3,511,457
AERIAL CARGO DISPENSER
Joseph M. Pogue, Wilmington, Del., assignor to All American Engineering Company, Wilmington, Del., a corporation of Delaware
Filed Sept. 6, 1968, Ser. No. 758,005
Int. Cl. B64d 1/02
U.S. Cl. 244—137
10 Claims

ABSTRACT OF THE DISCLOSURE

Aerial cargo dispenser comprises main body portion having at least one cargo receiving cell therein with cell door at exterior of main body portion. Flexible diaphragm is sealingly connected around inside of cell in spaced relationship from cell door whereby cargo in cell is disposed between diaphragm and door. Plenum in main body portion communicates with flexible diaphragm so that upon opening of cell door air pressure in plenum urges flexible diaphragm against cargo in cell with force sufficient to dispense cargo therefrom.

BACKGROUND OF THE INVENTION

The present invention relates to a cargo dispenser, and more particularly to an aerial cargo dispenser that utilizes available air pressure to dispense cargo therefrom.

Prior to the present invention, numerous methods and systems have been utilized to dispense cargo from in flight aircraft. Manual ejection of cargo is common as well as automated or semiautomatic ejection systems. For cargo ejection from aircraft flying at high speed automatic dispensing systems are necessary. Many of these systems utilize expendables, such as explosive charges, to generate the needed ejection force to dispense cargo, such as canister ordinance, for example. For the most part, the prior automatic cargo dispensing systems are somewhat complex and most expensive to manufacture. Moreover, when expendables are utilized, the overall cost of the dispensing operation is considerably more than that of a system which functions without using expendables.

Accordingly, it is an object of the present invention to provide a unique aerial cargo dispenser which avoids the above disadvantages of the prior arrangements and which functions in a highly beneficial manner to dispense cargo from in flight aircraft.

Another object of the present invention is the provision of an aerial cargo dispenser which is simple in construction and which is easily and economically operated.

SUMMARY OF THE INVENTION

In accordance with the present invention an aerial cargo dispenser is provided comprising a main body portion with at least one cargo receiving cell therein. A cell door at the exterior of the main body portion is arranged to provide access to the cell to facilitate loading the cell with cargo and dispensing the cargo therefrom. A flexible diaphragm sealingly connected around the inside the cell is spaced from the cell door so that cargo loaded in the cell is disposed between the diaphragm and the cell door. A plenum in the main body portion communicates with the flexible diaphragm to provide the ejection force needed to dispense the cargo from the cell. Structure is provided for opening the cell door and when so opened air pressure in the plenum urges the flexible diaphragm against cargo in the cell with a force sufficient to dispense the cargo therefrom.

The main body portion of the present cargo dispenser has a forward end opening which communicates with the plenum for charging the plenum with air. A closure member inside the main body portion moves between a forward position where it closes the forward end opening and an aft position spaced from the opening. A biasing device urges the closure member to its forward position. When the main body portion of the dispenser is connected to an aircraft the plenum is charged with air when the force of air acting on the closure member from outside the main body portion is sufficient to move the closure member from its forward to aft position. The forward velocity of the aircraft to which the cargo dispenser is connected creates a pressure differential across the closure member to open it. Moreover, the closure member may be conical with the apex thereof extending outwardly of the forward end opening in the main body portion when the closure is in its forward position closing off the opening.

Preferably, the aerial cargo dispenser of the present invention includes a plurality of cargo receiving cells in the main body portion. Each cell has a cell door at the exterior of the body portion as well as a flexible diaphragm sealingly connected around the inside of each cell in spaced relationship from its respective cell door. Cargo in each cell is disposed between the flexible diaphragm therein and the cell door. The plenum in the main body portion communicates with each flexible diaphragm to provide the ejection force needed to dispense the cargo when the individual cell doors are opened.

Moreover, the individual cell doors may be spaced in a line from the forward to the aft end of the main body portion, one adjacent the other. The mechanism for opening the cell doors is preferably arranged to first open the cell door furthest removed from the forward end of the main body portion, and thereafter open the remaining doors in succession from the aft to the forward end of the main body portion. Each cell door includes a hinged connection which enables the door to swing approximately 180° when it is opened. Such an arrangement enables selected cell doors to close off adjacent cells after cargo is dispensed. The hinged connections may be spring loaded to open the cell doors. Additionally, a spare door may be connected to the main body portion to close the cargo cell closest to the forward end of the main body portion after cargo in that cell is dispensed.

BRIEF DESCRIPTION OF THE DRAWING

Novel features and advantages of the present invention in addition to those mentioned above will become apparent to one skilled in the art from a reading of the following detailed description in conjunction with the accompanying drawing wherein similar reference characters refer to similar parts and in which:

FIG. 1 is a longitudinal sectional view of an aerial cargo dispenser according to the present invention;

FIG. 2 is a sectional view taken along line 2—2 of FIG. 1;

FIG. 3 is a sectional view taken along line 3—3 of FIG. 1;

FIG. 4 is a pictorial view illustrating the cell door hinge and latch arrangement;

FIG. 5 is a sectional view taken along line 5—5 of FIG. 2;

FIG. 6 is an enlarged front elevational view of the latch arrangement; and

FIG. 7 is an enlarged longitudinal sectional view of the forward end of the aerial cargo dispenser.

DETAILED DESCRIPTION OF THE INVENTION

Referring in more particularity to the drawing, an aerial cargo dispenser 10 comprises a main body portion 12 having a plurality of cargo receiving cells 14 therein arranged to receive cargo 16. Each of the cargo receiving cells is formed in part by upwardly extending spaced apart partition structure 18 oriented transversely relative to the main body portion 12 of the dispenser. Moreover, each cargo cell has a flexible diaphragm 20 sealingly connected around the inside of the cell, as best shown in FIG. 3. The diaphragms 20 may be fabricated of rubber or synthetic rubber-like material and one diaphragm is connected to the inside of each cell at the upper end thereof by suitable fasteners, such as crews 22, for example. Each diaphragm is secured around its periphery to the partition structure 18 forming a cell, and also to the interior of the main body portion 12.

The cargo receiving cells 14 each include a cell door 24 connected at one side to the lower end of the partition structure 18 by a hinge 26. The opposite side of the cell door is releasably latched to the other partition structure forming the cell, as explained more fully below.

Each cell 14 also has a latch assembly 28 associated with it connected to a solenoid operator 30 by a flexible tie 32 which passes through a hollow 34 in the partition structure 18. The solenoid operator is mounted at the upper end of its respective cell by support structure and each operator includes an eccentric 36 for manipulating the flexible tie 32 when the operator is energized. The latch assembly 28 includes a first pair of arms 38 pivoted together at 40 and a second pair of arms 42 pivoted together at 44. The first and second arms of the latch assembly 28 are also pivoted to each other, as shown in FIG. 6, and a biasing device 45 is connected between the pivots 40 and 44. The pivot 40 also serves to connect the latch assembly 28 to the partition structure inside the hollow 34 at the lower end thereof. As can readily be understood, when the flexible tie is pulled upwardly the lower ends of the first arms 38 move away from each other about the pivot 40 to thereby release a pin 46 connected to the unhinged side of each cell door 24. Further, the hinged side of each cell door includes a torsion spring 48 tensioned to swing the door open when the unhinged side is released from the latch assembly 28. As explained more fully below, the cell doors are arranged to swing 180° so that one cell door closes off an adjacent empty cell during the dispensing operation.

The aerial cargo dispenser 10 also includes a plenum chamber 50 charged with air pressure, as described below, to provide the ejection force necessary to dispense cargo 16 from the individual cells 14. The plenum comprises the portion of the main body 12 which is unoccupied by cargo and is in communication with the flexible diaphragms 20 on the sides of the diaphragms opposite the cargo.

The forward end of the main body portion 12 includes an end opening 52 that communicates with the plenum 50 for charging the plenum with air. A closure member 54 inside the main body portion 12 moves between a forward position where it closes off the forward end opening and an aft position spaced from that opening. The closure member includes a conical portion 56 with the apex thereof extending outwardly of the opening 52 when the closure is in its forward position. Also, the closure member includes a tubular stem 58 connected to the conical portion 56 which slides within a slightly larger hollow stationary mounting 60 anchored to the main body 12 by support structure 62. Movement of the conical portion 56 between forward and aft positions is limited by a pin 64 on the stem 58 which slides in a longitudinal slot 66 in the stationary mounting 60. A coil spring 68 disposed inside the stem 58 and the mounting 60 functions to urge the conical portion of the closure member 54 to the forward extent of its longitudinal movement where it closes off the end opening 52 in the main body portion 12. As can readily be understood, with the aerial cargo dspenser 10 fastened to the exterior of aircraft structure 70 and the aircraft in flight, a pressure differential is created across the conical portion of the closure member to open it. This occurs when the force of exterior air pressure acting on the conical portion of the closure is greater than the force of air pressure inside the plenum 50 by a least the force of the biasing device 68. Under these conditions the plenum 50 is charged with air.

The aerial cargo dispenser 10 also includes a spare cell door 72 connected to the main body portion 12 for closing the last cell to be opened during the dispensing operation. This is the cell closest to the forward end of the main body portion. The spare door 72 is urged outwardly of the main body portion 12 by a biasing arrangement 74 but is held in its stowed position by a solenoid operated latch 76. The upper end of the spare cell door 72 has a pair of pins 78 on opposite sides thereof which slide in stationary tracks 80 when the spare door is released from its stowed position. When so released, the spare door is forced downwardly by the biasing arrangement 74 and the pins 78 engage the lower closed ends of the tracks 80 to prevent further outward motion of the door. The spare door then swings inwardly toward the main body portion to cover the cell next to it after the cargo therein is ejected. A suitable torsion spring assembly may be provided to swing the spare door inwardly into covering relationship with the cell.

The aerial cargo dispenser 10 is loaded with cargo by first opening each of the cell doors 24. The cargo parcels 16 are then loaded into each cell and the doors closed by latching the door pins 46 between the arms 38 of the individual latching assemblies 28. The spare cell door 72 is in its stowed position, as shown in FIG. 1. The cargo dispenser may be loaded prior to or after securing the dispenser to the aircraft structure 70. Next, when the aircraft is in flight the plenum 50 is charged with air until the pressure differential across the closure member 54 is less than the force of the coil spring 68. Under these conditions the closure member is urged to its forward position by the coil spring until the conical portion thereof closes off the forward opening in the main body portion 12 of the dispenser. After the plenum is charged with sufficient air pressure the cargo dispenser is then ready to eject the individual parcels 16 from the cargo receiving cells 14. Preferably, the cargo in the cell furthest removed from the forward portion of the main body 12 is dispensed first and this is accomplished by energizing the solenoid operator 30 associated with that cell. When the solenoid is energized the eccentric 36 pulls the flexible tie 32 connected thereto in an upward direction to thereby move the lower ends of the arms 38 of the latching assembly 28 away from each other. With the arms so positioned the door pin 46 connected to cell door 24 is released whereby the door is free to swing open about its hinge structure 26. The cell door swings approximately 180° under the motivating force of the torsion spring 48 assisted by the air striking the open cell door. When opened and rotated 180° the cell door closest to the tail section of the main body portion 12 abuts the tail section and may be anchored to that section by suitable latching means, such as magnets, for example. Upon opening of the cell door the pressure in the plenum urges the flexible diaphragm 20 against the cargo 16 with a force sufficient to dispense the cargo therefrom.

The cargo in the next adjacent cell is ejected from the dispenser by actuating the solenoid operator 30 associated with that cell. After the cell door swings open the pressure in the plenum urges the diaphragm downwardly to the bottom of the cell to eject the cargo in the same manner as described above. The torsion spring 48 associated with the second cell door swings that door approximately 180° to a position where it now closes off the first cargo cell. The dispensing operation continues by ejecting cargo from adjacent cells until all the cargo is dispensed. Finally, after the cargo in the last cell is ejected the solenoid operator 76 for the spare cell door 72 is energized which ultimately causes that door to cover the cell holding the cargo last dispensed.

What is claimed is:

1. An aerial cargo dispenser comprising a main body portion with at least one cargo receiving cell therein, a cell door at the exterior of the main body portion arranged to provide access to the cell, a flexible diaphragm sealingly connected around the inside of the cell in spaced relationship from the cell door whereby cargo in the cell is disposed between the flexible diaphragm and the cell door, a plenum in the main body portion communicating with the flexible diaphragm, and means for opening the cell door whereby air pressure in the plenum urges the flexible diaphragm against cargo in the cell with a force sufficient to dispense the cargo therefrom when the cell door is opened.

2. An aerial cargo dispenser as in claim 1 wherein the main body portion includes a forward end opening communicating with the plenum for charging the plenum with air, a closure member inside the main body portion movable between a forward position where it closes off the forward end opening and an aft position spaced from the opening, and biasing means urging the closure member to its forward position.

3. An aerial cargo dispenser as in claim 2 including fastening structure connected to the main body portion for securing the dispenser to an aircraft whereby in flight the plenum is charged with air when the force of air acting on the closure member from outside the main body portion is sufficient to move the closure member from its forward to aft position.

4. An aerial cargo dispenser as in claim 2 wherein the closure member is conical with the apex thereof extending outwardly of the forward end opening in the main body portion when the closure member is in its forward position closing off the opening.

5. An aerial cargo dispenser as in claim 1 including a plurality of cargo receiving cells in the main body portion, each cell having a cell door at the exterior of the main body portion, a flexible diaphragm sealingly connected around the inside of each cell in spaced relationship from its respective cell door whereby cargo in each cell is disposed between the flexible diaphragm therein and the cell door, the plenum in the main body portion communicating with each flexible diaphragm, and means for opening the cell doors.

6. An aerial cargo dispenser as in claim 5 wherein the main body portion includes a forward end opening communicating with the plenum for charging the plenum with air, and a movable closure member inside the main body portion at the forward end opening.

7. An aerial cargo dispenser as in claim 5 wherein the main body portion has forward and aft ends and the cell doors are spaced in a line from forward to aft one adjacent the other, the means for opening the cell doors being constructed and arranged to first open the cell door furthest removed from the forward end of the main body portion and thereafter open the remaining doors in succession from the aft to the forward end of the main body portion.

8. An aerial cargo dispenser as in claim 7 including a spare cell door connected to the main body portion for closing the cell closest to the forward end of the main body portion after cargo in that cell is dispensed.

9. An aerial cargo dispenser as in claim 7 wherein each cell door includes a hinged connection that enables the door to swing approximately 180° when it is opened whereby selected cell doors close off adjacent cells after cargo is dispensed.

10. An aerial cargo dispenser as in claim 9 wherein the hinged connection includes spring means loaded to swing the cell doors approximately 180° after they are opened.

References Cited
UNITED STATES PATENTS

| | | | |
|---|---|---|---|
| 2,723,093 | 11/1955 | Price et al. | 244—137 |
| 2,905,055 | 9/1959 | Camp et al. | 244—137 X |
| 2,954,949 | 10/1960 | Smith et al. | 244—137 |

FERGUS S. MIDDLETON, Primary Examiner

J. E. PITTENGER, Assistant Examiner

U.S. Cl. X.R.

89—1.5